Figure 1:
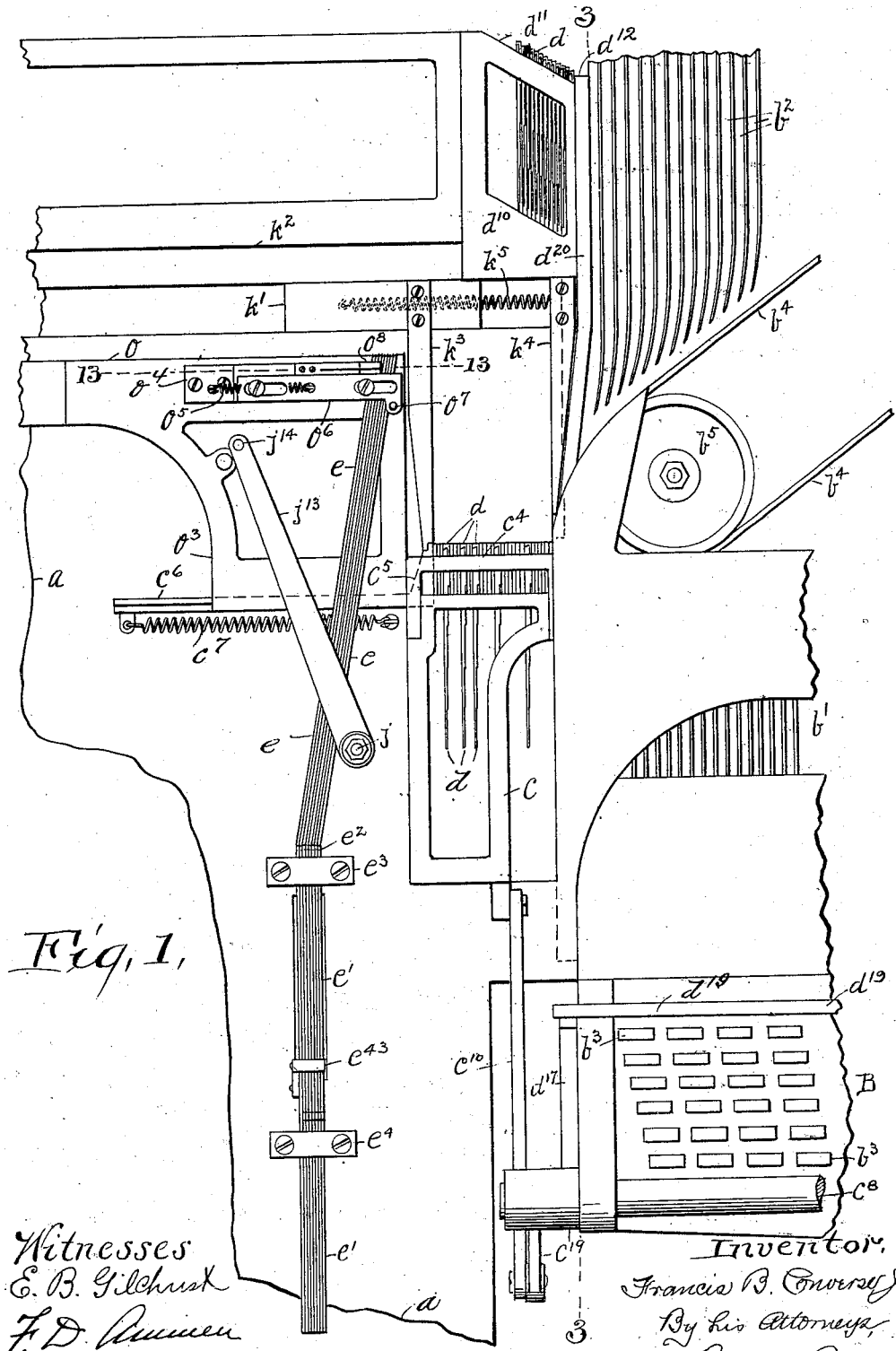

No. 746,295. PATENTED DEC. 8, 1903.
F. B. CONVERSE, JR.
JUSTIFYING MECHANISM.
APPLICATION FILED MAR. 31, 1900. RENEWED APR. 11, 1903.
NO MODEL. 10 SHEETS—SHEET 1.

Witnesses
E. B. Gilchrist
F. D. Ammen

Inventor.
Francis B. Converse Jr.
By his Attorneys,
Thurston & Bates

No. 746,295. PATENTED DEC. 8, 1903.
F. B. CONVERSE, Jr.
JUSTIFYING MECHANISM.
APPLICATION FILED MAR. 31, 1900. RENEWED APR. 11, 1903.
NO MODEL. 10 SHEETS—SHEET 4.

No. 746,295. PATENTED DEC. 8, 1903.
F. B. CONVERSE, Jr.
JUSTIFYING MECHANISM.
APPLICATION FILED MAR. 31, 1900. RENEWED APR. 11, 1903.
NO MODEL. 10 SHEETS—SHEET 5.

Witnesses
E. B. Gilchrist
F. D. Ammen

Inventor,
Francis B. Converse Jr.
By his Attorneys,
Thurston & Bates.

No. 746,295. PATENTED DEC. 8, 1903.
F. B. CONVERSE, JR.
JUSTIFYING MECHANISM.
APPLICATION FILED MAR. 31, 1900. RENEWED APR. 11, 1903.
NO MODEL. 10 SHEETS—SHEET 9.

Witnesses
E. B. Gilchrist
F. D. Ammen

Inventor,
Francis B. Converse, Jr.
By his Attorneys,
Thurston & Bates

No. 746,295. PATENTED DEC. 8, 1903.
F. B. CONVERSE, Jr.
JUSTIFYING MECHANISM.
APPLICATION FILED MAR. 31, 1900. RENEWED APR. 11, 1903.

NO MODEL. 10 SHEETS—SHEET 10.

Witnesses.
E. B. Gilchrist
F. D. Ammen

Inventor,
Francis B. Converse Jr,
By his Attorney,
Thurston & Bates.

No. 746,295. Patented December 8, 1903.

UNITED STATES PATENT OFFICE.

FRANCIS B. CONVERSE, JR., OF LOUISVILLE, KENTUCKY, ASSIGNOR TO THE CONVERSE MANUFACTURING COMPANY, OF CLEVELAND, OHIO, A CORPORATION OF OHIO.

JUSTIFYING MECHANISM.

SPECIFICATION forming part of Letters Patent No. 746,295, dated December 8, 1903.

Application filed March 31, 1900. Renewed April 11, 1903. Serial No. 152,263. (No model.)

*To all whom it may concern:*

Be it known that I, FRANCIS B. CONVERSE, Jr., a citizen of the United States, residing at Louisville, in the county of Jefferson and State of Kentucky, have invented a certain new and useful Improvement in Justifying Mechanisms, of which the following is a full, clear, and exact description, reference being had to the accompanying drawings.

The object of the invention is to provide an efficient machine for the justification of type by the selection from preëxisting different-sized spaces those which will in the aggregate equal the aggregate of space required, while individually they approximate as near as may be the theoretic equal individual spaces. The selecting mechanism which I have devised for this purpose is equally adaptable for the justification of any kind of type, whether it be ordinary printers' type (cameo) or the matrices of a line-casting machine. Herein it is shown in the latter embodiment, the graded preëxisting sizes of permanent spaces being collected together to form a rigid stepped space-bar.

To the above end the invention includes, broadly, means for measuring the shortage of a line to be justified, means for taking account or measuring the number of spaces to be justified in the line, a series of relatively movable projections, means for varying their relative distance according to one of these measurements and for varying their aggregate position according to the other, and a connection between this resultant position and the spaces to be in the justified line, whereby the proper size are selected.

The invention comprehends also a series of stepped space-bars, means for measuring the line with the bars inserted therein in similar positions, means for computing from this measurement and from the number of space-bars in action the proper steps of the different space-bars to be in the line to produce the proper aggregate thickness, and means for so withdrawing the space-bars.

The embodiment of the invention in a line-casting machine, more or less particularly as hereinafter shown and described, is also of my invention.

The invention may thus be conveniently summarized as consisting of the combinations of elements hereinafter described, and set out in the claims.

In the accompanying drawings I have represented the invention as applied to the general form of machine illustrated in patent of Ottmar Mergenthaler, No. 436,532, dated September 16, 1890, to which reference may be made for accompaniments not involved in the present invention.

Figure 2:
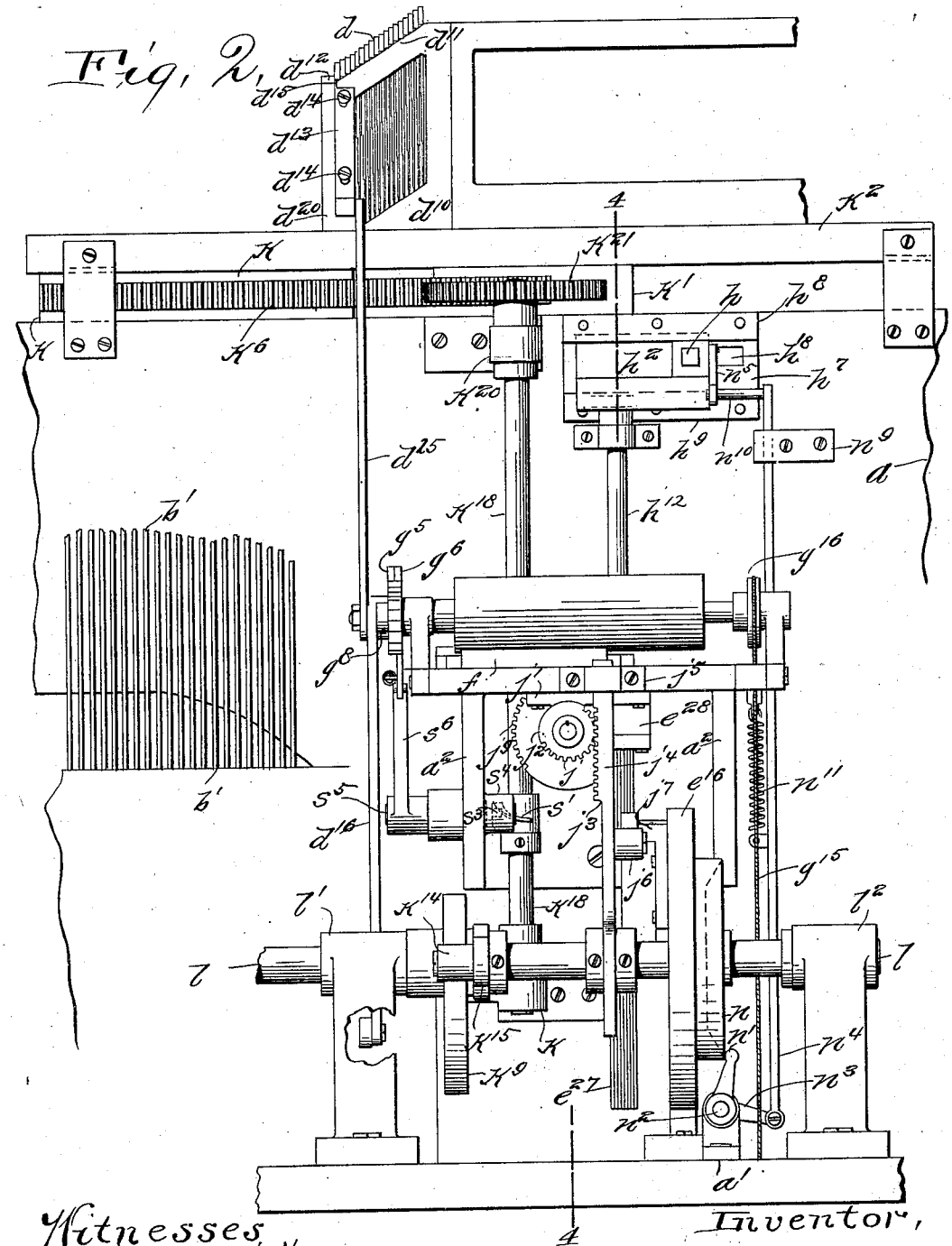
Figure 3:
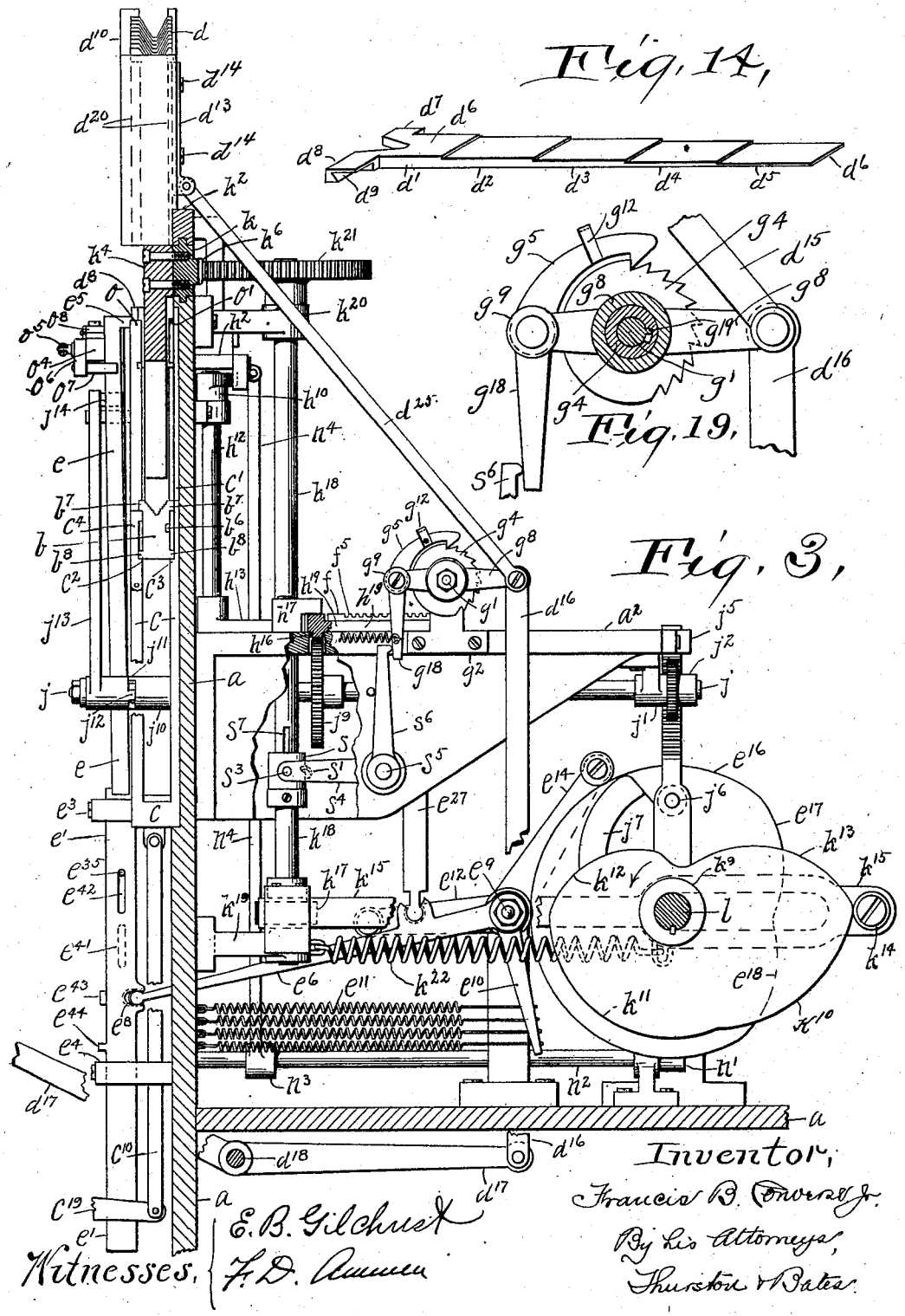
Figure 4:
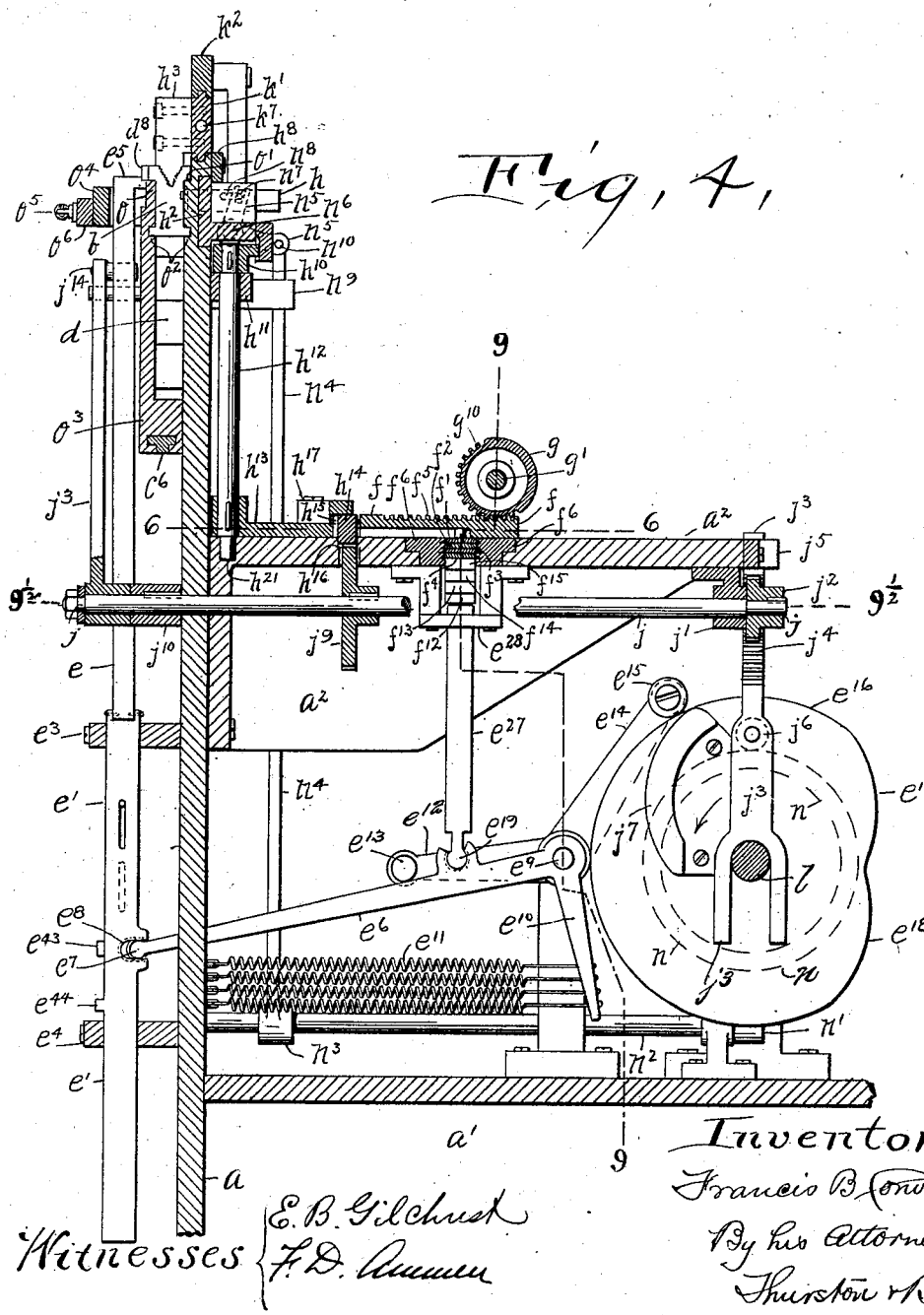
Figure 5:
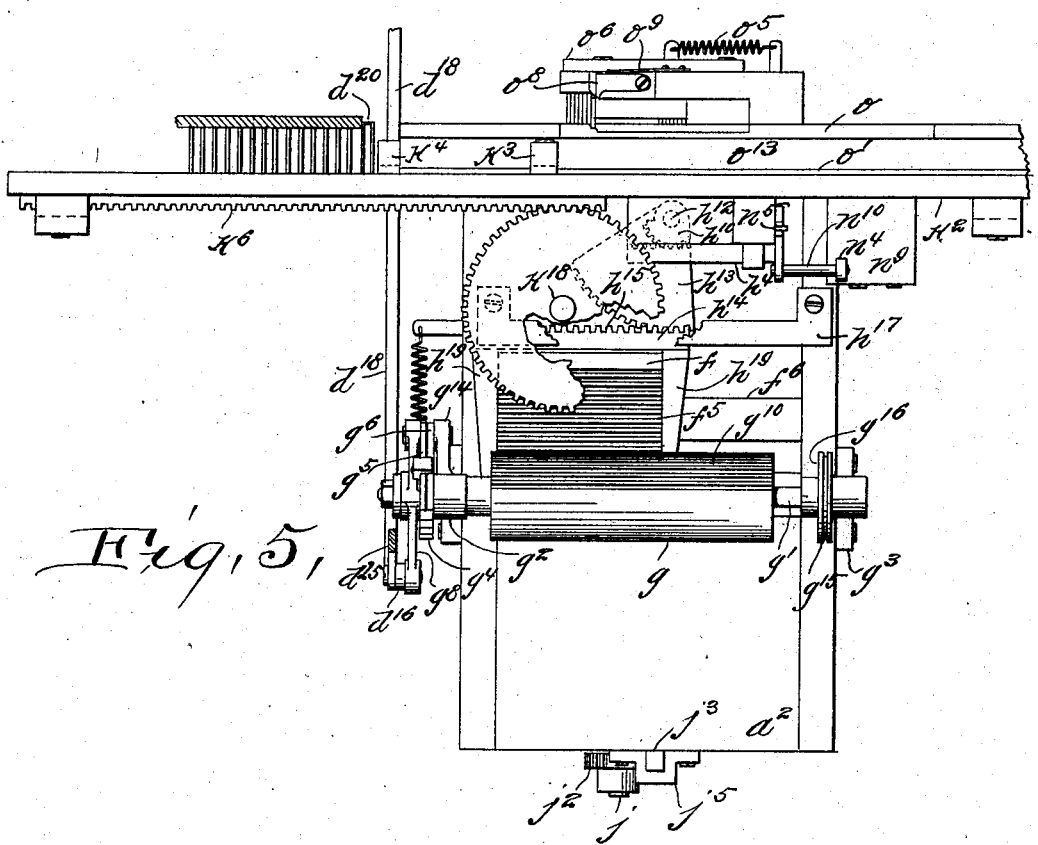
Figure 6:
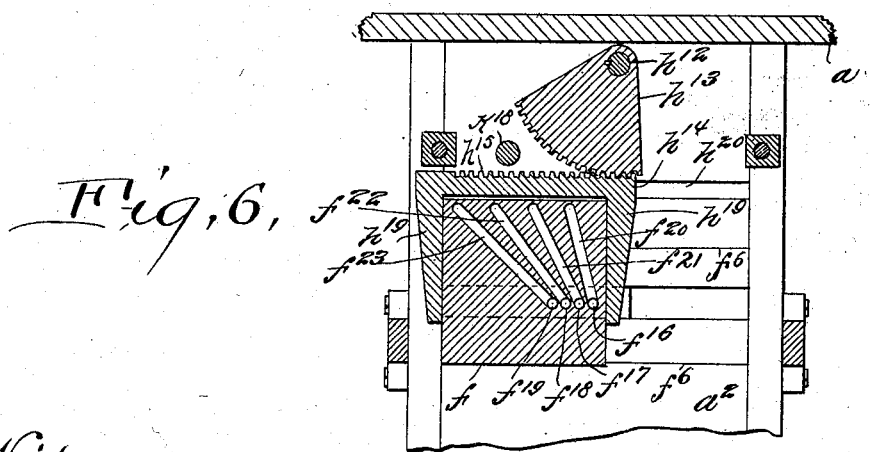
Figure 7:
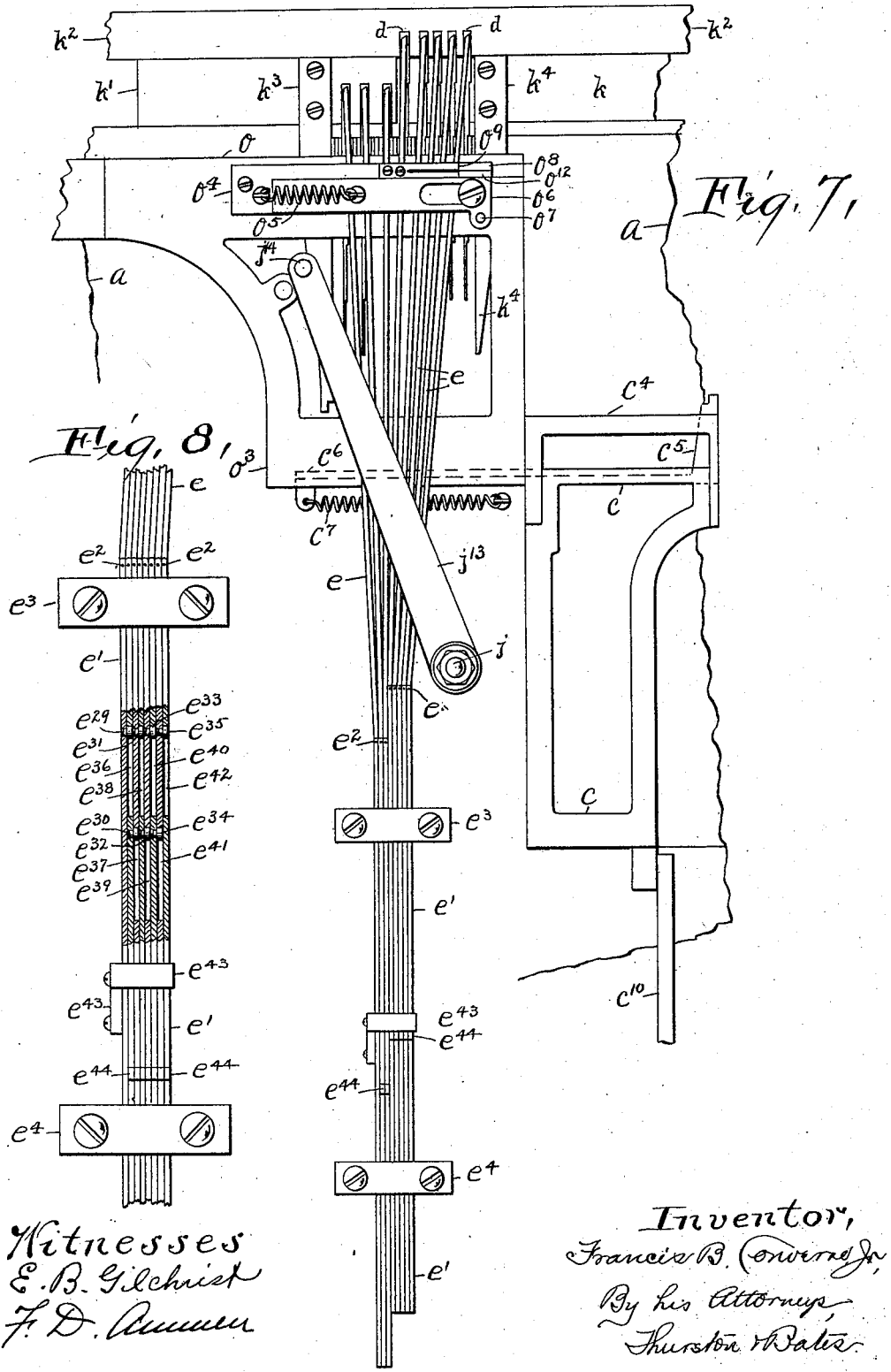
Figure 8:
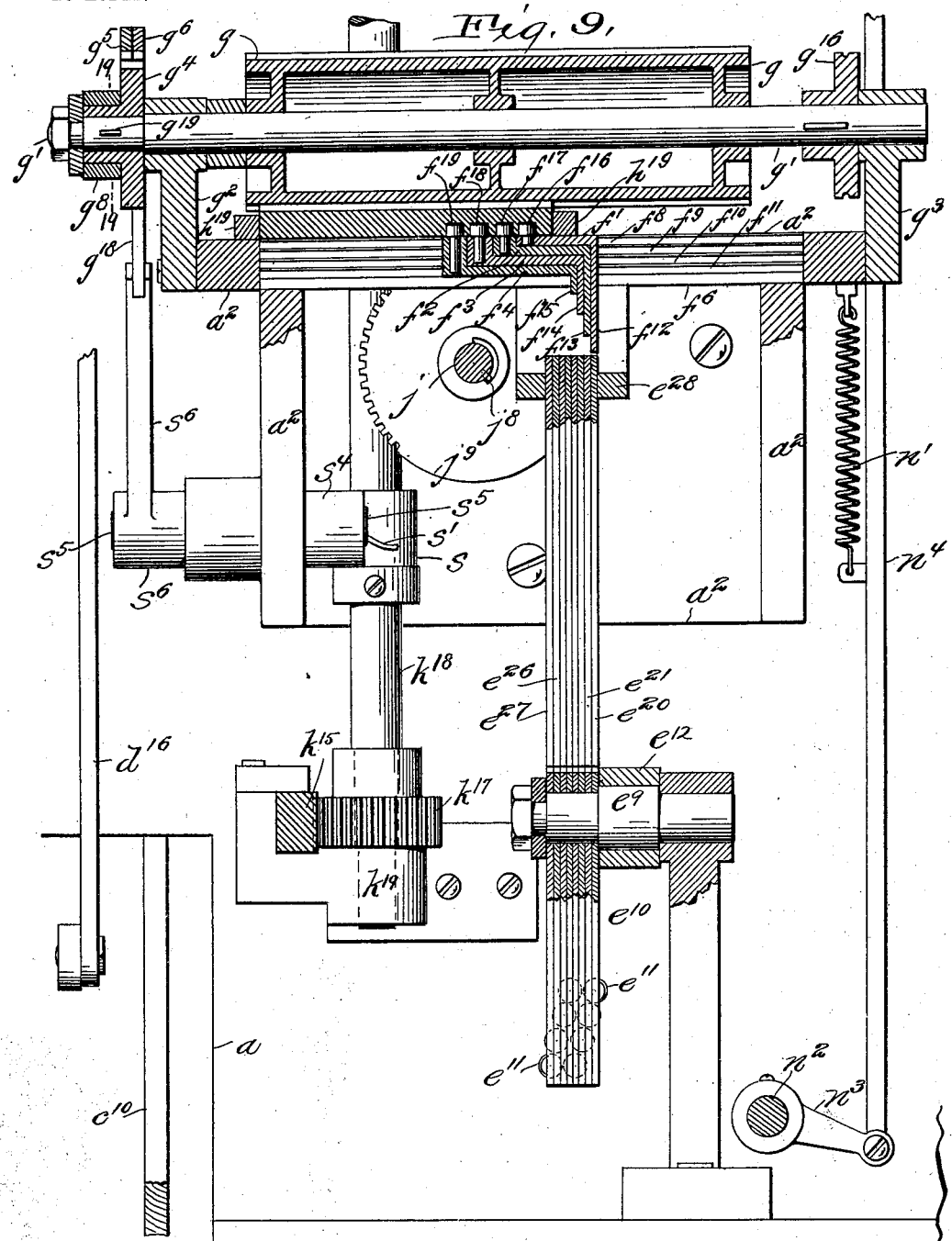
Figure 9:
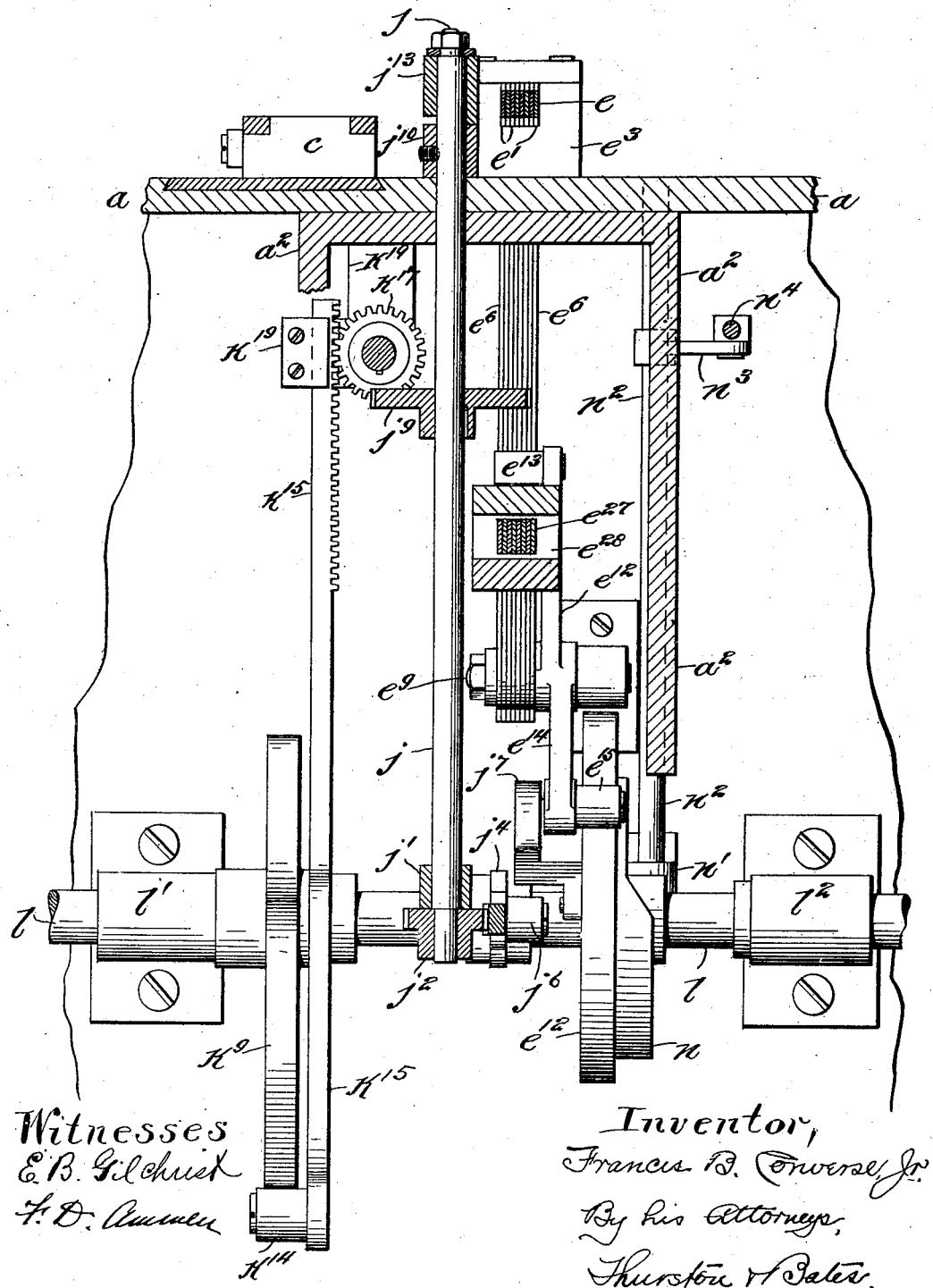
Figure 10:
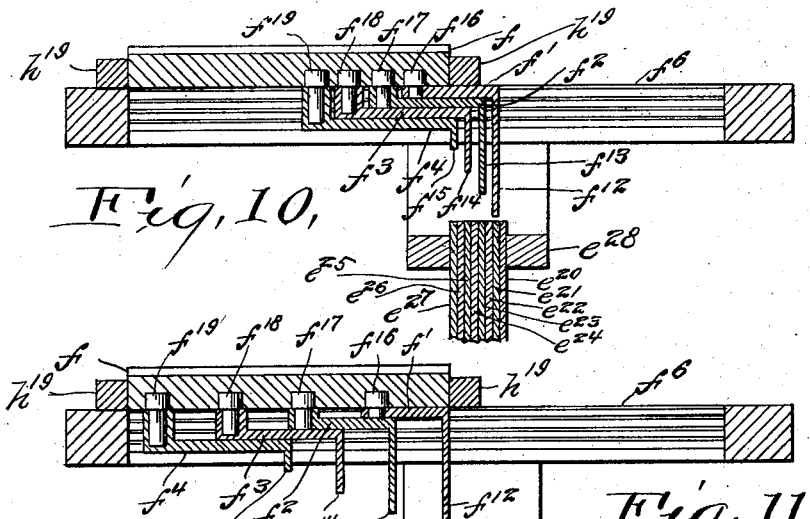
Figure 11:
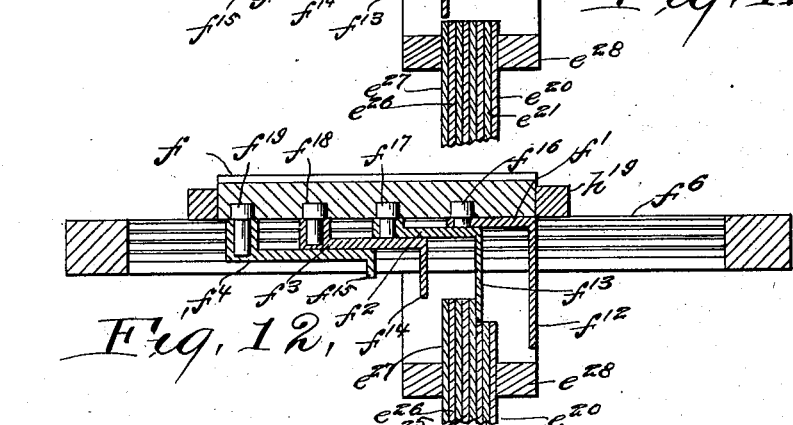
Figure 12:
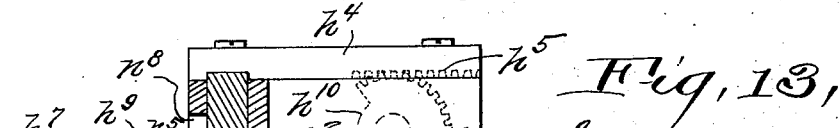
Figure 13:
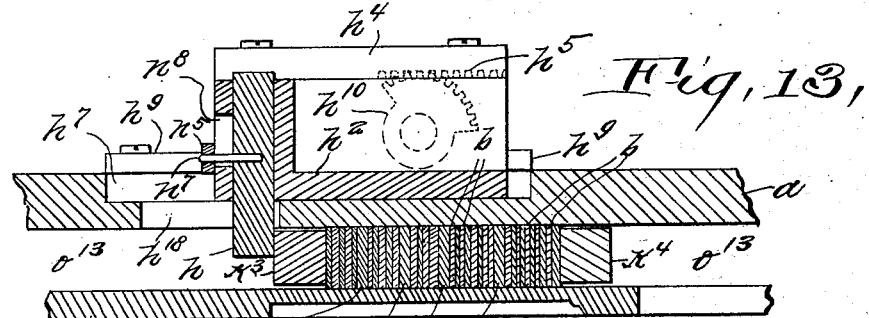
Figure 15:
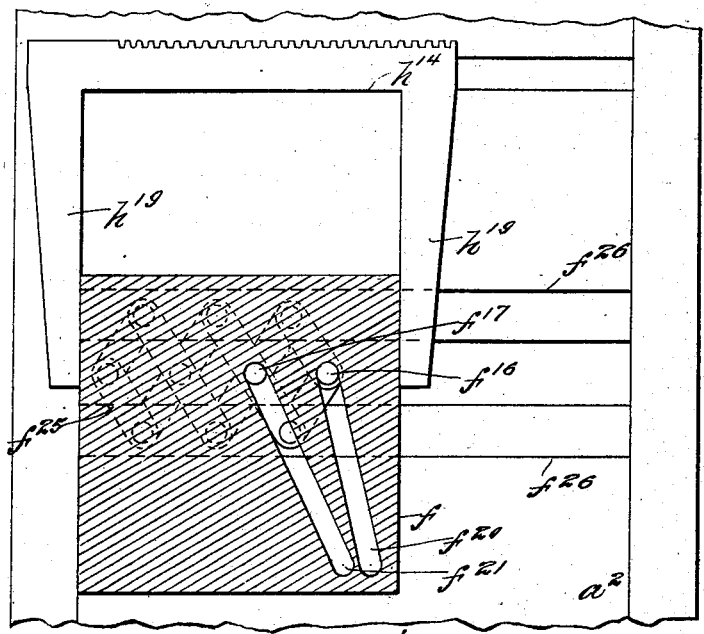
Figure 16:
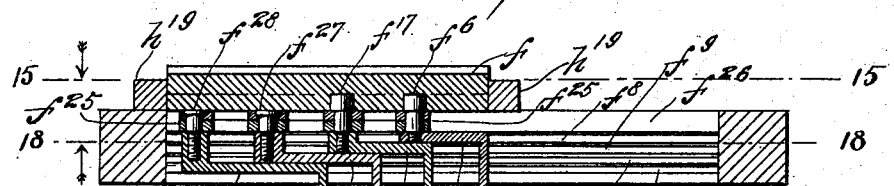
Figure 17:
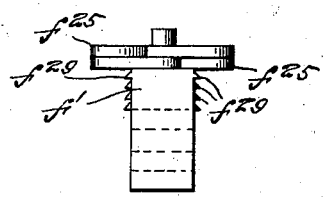
Figure 18:
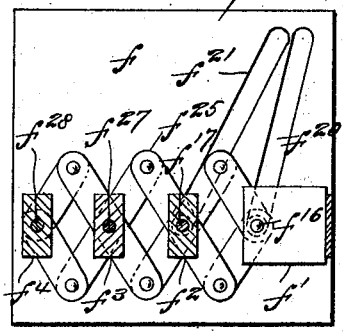

Figure 1 is a front elevation of a portion of such a machine with my invention applied thereto. Fig. 2 is a corresponding rear elevation. Fig. 3 is a vertical cross-section on line 3 3 of Fig. 1 looking from the right of that figure. Fig. 4 is a vertical cross-section approximately on the line 4 4 of Fig. 2 looking from the left of that figure. Fig. 5 is a plan, (parts above the bar $k^2$ being removed;) and Fig. 6 is a detail, being a horizontal section on line 6 6 of Fig. 4. Fig. 7 is a portion of Fig. 1, on a larger scale, showing parts in a different position. Fig. 8 is an enlarged detail of the lower portion of the lifters $e'$, partly broken away. Figs. 9 and $9\frac{1}{2}$ are enlarged details, being respectively a vertical section on the line 9 9 of Fig. 4 and a horizontal section on the line $9\frac{1}{2}$ $9\frac{1}{2}$ of that figure. Figs. 10, 11, and 12 are details further illustrating parts appearing in Fig. 9, showing them in different positions corresponding to the requirements for justification of different lines. Fig. 13 is a detail, being a horizontal section on line 13 13 of Fig. 1. Fig. 14, on the same sheet with Fig. 3, is a perspective view of a spacing-bar herein employed. Figs. 15 to 18 illustrate a modification of the space-determining mechanism, Fig. 15 being a sectional plan corresponding to Fig. 6, Fig. 16 an elevation in section corresponding to Figs. 10, 11, and 12, Fig. 17 an end elevation of the variable projections looking at them from the right of Figs. 15 and 16, and Fig. 18 a horizontal section on the line 18 18 of Fig. 16 looking from below. Fig. 19, on the same sheet with Fig. 3, is an enlarged elevation of the space-accounting mechanism shown in that figure, being a vertical section on the line 19 19 of Fig. 9.

*Frame.*—The various mechanisms involved are shown as supported upon the two sides of a vertical frame-plate $a$, on a horizontal frame-plate $a'$, and on a bracket $a^2$, fixed to the rear side of plate $a$.

*Assembling mechanism.*—B represents a keyboard of any desirable form connected by wires or rods $b'$ with the ejectors of a magazine containing a supply of matrices. The form of the magazine not being involved in the present invention it is not shown in the drawings. It would, however, stand above the channels $b^2$, through which (a key $b^3$ being depressed) a matrix would be delivered upon the traveling-belt $b^4$, running over the wheel $b^5$, and delivered thereby in the assemblage-elevator $c$. Any of the well-known mechanisms for assembling matrices may be used in this connection.

The assemblage-elevator consists of the U-shaped part $c$, Figs. 1 and 3, which is vertically slidable in gibs $c'$ (shown in Fig. 3) on the plate $a$. The matrices $b$ are of the form shown in the patent referred to and consist of flat pieces of brass having the character formed in its edge at $b^6$, Fig. 3, and provided with the ears $b^7 b^7$ and $b^8 b^8$. The matrices as they are delivered from the belt $b^4$ are assembled in the upper end of the member $c$, resting upon the shoulder $c^2 c^3$. The upper portion $c^4$ of the forward side of the assemblage member $c$ is hinged in order that it may be turned back to give access to the line. The forward end of the line of matrices is sustained by the foot $c^5$, Figs. 1 and 7, on the slide $c^6$, slidable in a groove in the part $c^3$. The increasing line of matrices presses back this foot against the tension of a spring $c^7$.

*Space-bars.*—A space-bar is shown in Fig. 14. It consists of a portion $d^6$ of the same width as the matrices with which it is used and thicker at one end than at the other, decreasing in thickness by regular steps. The space-bar shown has five steps $d'$ to $d^5$, which may conveniently vary by .015 inch, the gamut thus running from .090 to .030 in thickness. The portions $d'$ to $d^5$ between the successive offsets are each of uniform thickness throughout their respective lengths and are each of a length sufficient to reach from the upper end of a matrix to a point below the character therein, at $b^6$, Fig. 3. The shoulders between the successive portions are square. The bar may be considered as being made up of successive sizes of simple spaces increasing by a common difference joined together at their edges to form the integral stepped bar, as shown. At the larger end of the bar are the ears $d^7$ and $d^8$, the former of which is of substantially the same size as the ears $b^7$ of the matrix. The other ear, $d^8$, is considerably wider than the ears of the matrices and is partially cut away to form the notch $d^9$, as shown. The common difference in the thickness of the different sections is hereinafter referred to as the "space-bar unit."

*Inserting space-bars into the line.*—A supply of these space-bars is provided in the machine, being contained in a holder $d^{10}$, Figs. 1, 2, and 3, within which they are suspended by means of the ears $d^7$ and $d^8$, which rest upon the inclined edges $d^{11}$ of the holder $d^{10}$. They are placed in the holder with the larger ear $d^8$ toward the front and the stepped side toward the right, as shown, and tend to slide toward the lower end of the incline $d^{11}$ until stopped by the shoulders $d^{12}$. On the rear side of the holder $d^{10}$ is a lifter $d^{13}$, Fig. 2, slidable on the screws $d^{14}$, the upper end $d^{15}$ of which stands below the ear $d^7$ of the first space-bar in the holder. The lifter $d^{13}$ is connected, by means of the links $d^{25}$ and $d^{16}$, with the space-key lever $d^{17}$, fulcrumed at $d^{18}$ and carrying the space-key $d^{19}$, Fig. 1, on its forward end. The link $d^{16}$ connects also with the lever-arm $g^8$ at the point of its connection with the link $d^{25}$, as hereinafter described. When the space-key is depressed following the assemblage of a word, the lifter $d^{13}$ is caused to raise a space-bar clear of the shoulder $d^{12}$. Gravity acting on the space-bar behind it causes it to be advanced over the shoulders $d^{12}$ to a position from which it falls through the channel $d^{20}$ into the assemblage member $c$ adjacent to the previously-set word. It is supported in the assemblage member by the ear $d^7$ with its thickest section $d'$ between the matrices, as shown in Fig. 1. A line of matrices and space-bars is thus assembled the length of which before justification is at least as great as the length of the desired line, but not greater than the length of the desired line by an amount more than the difference between the thickest and thinnest portions of a space-bar multiplied by the number of space-bars in the line, wherefore the subsequent readjustment of the space-bars may give the line the required length.

*Advancing the line into position where it is justified.*—Carried in grooves in the upper edge of the frame-plate $a$, Figs. 1, 3, and 4, and in the lower edge of the bar $k^2$ are the slides $k$ and $k'$, the slide $k$ having affixed to its rear side the rack $k^6$. A spring $k^5$, attached at its ends to the two slides, (the spring occupying a hole $k^7$ in the slide $k$ in order to be of sufficient length,) tends to draw the two sides together. Fixed to the forward side of the slides $k$ and $k'$ are the fingers $k^4$ and $k^3$, respectively, the latter extending downward into the path of the upper end of the foot $c^5$, by which it is engaged and moved to the left as the line increases in length. As many matrices and space-bars as the line will properly contain having been assembled, the assemblage member $c$ is elevated to the level of the track $o$, Fig. 1, by means of a hand-lever (not shown) on the shaft $c^8$, which is connected, by means of a lever $t^{19}$ and a link $c^{10}$, with the member $c$. A cam-shaft $l$, carried in bearings $l' l^2$, Figs. 2, 3, and $9\frac{1}{2}$, is connected with a source of power of the machine by any means which will give it one complete rotation immediately succeeding the elevation of the assemblage member c. For convenience of illustration this shaft is here shown as an auxiliary shaft carrying only the cams concerned in the justification, and the operation of the cams occupy the whole of the rotation of the shaft. The line being elevated passes up between the fingers $k^3$ and $k^4$, heretofore mentioned, to the level of the rail o and the shoulder $o'$, Figs. 1, 3, and 4, the rail o being supported from the plate a by the bracket $o^3$, secured to the plate low enough down to permit the passage of the space-bars. As the line reaches this level the shaft l begins to rotate in the direction of the arrow in Figs. 3 and 4, causing first a decreasing face $k^{10}$ of the cam $k^9$ to pass the roller $k^{14}$ on the link $k^{15}$, yoked around the shaft l. The link $k^{15}$ has at its other end gear-teeth meshing with the gear $k^{17}$ on a vertical shaft $k^{18}$, Figs. 3 and 9. This shaft is carried in bearings $k^{19}$ and $k^{20}$ and carries at its upper end a gear $k^{21}$, which meshes with the rack $k^6$ on the rear side of the slide k, above referred to. A spring $k^{22}$ draws the link $k^{15}$ to the left in Fig. 3 as the decreasing face of the cam passes the roller, rotating the shaft $k^{18}$ to advance the rack $k^6$, and therewith the fingers $k^4$ and $k^3$ and the interposed line of matrices toward the left of the machine, the matrices and space-bars sliding upon the rail o and shoulders $o'$, the ears $b^8$ of the matrices traveling in the grooves $o^2$. The line comes to rest approximately in the position shown in Fig. 7 during the passage of the concentric face $k^{11}$ of the cam $k^9$.

*Space-bar lifters and their engagement by the space-bars.*—On the front side of the plate a, carried in bearings $e^3$ $e^4$, (in which they are free to move vertically,) is a series of flat strips $e'$ of the form shown in Figs. 1 and 3. Pivoted at $e^2$ to each of these strips are the strips e, which may be swung in a plane parallel with the plate a on the pivots $e^2$. The hinged strips thus provided I term "lifters." These lifters stand normally, as shown in Figs. 1 and 4, with their upper ends between the rail o and the rigid bracket $o^4$. The overhanging end $e^5$ of the left-hand lifter projects into the path of the ears $d^8$ of the space-bars in the line as they travel along the path $o^{13}$, bounded by the rail o and the shoulder $o'$, as shown in Fig. 4. A spring $o^5$, acting through a slide $o^6$ and a pin $o^7$, tends to draw the ends of the lifters toward the left. They are stopped, however, by the beveled corner of a pawl $o^8$, Fig. 5, under tension of a leaf-spring $o^9$ sufficient to overcome the pull of the spring $o^5$. Held in this position, the overhanging end $e^5$ of the left-hand lifter stands in the path of the ear $d^8$ of the first space-bar in the line, as above mentioned. As the line is advanced along its path $o^{13}$ the projecting end of the lifter is engaged by the ear of the first space-bar and forced thereby past the pawl $o^8$, the bevel $o^{10}$, Fig. 13, thereafter pressing the lifter back farther into the notch $d^9$ in the ear of the space-bar for better engagement. The spring $o^5$ thereupon draws the remaining lifters to the left until the first one remaining comes into the position just occupied by the one engaged by the space-bar, another pawl, $o^{12}$, Fig. 13, just below the pawl $o^8$, pressing it toward the line of matrices under the action of the leaf-spring $o^9$ into position to be engaged by the next space-bar. Thus as each space-bar passes the upper ends of the lifters it will engage and carry along with it one of the lifters.

*Space-accounting mechanism*, (Figs. 2, 3, 4, 5, 6, 9, and 19.)—The lever $g^8$, heretofore referred to, with which the space-key is connected by means of the link $d^{16}$, is fulcrumed on the hub of a ratchet $g^4$ on a shaft $g'$. This shaft is carried in bearings $g^2$ and $g^3$ on the bracket $a^2$, and a cylinder g is fixed thereto. This cylinder has gear-teeth $g^{10}$, extending from end to end, cut on a portion of its circumference, as shown. The other end, $g^9$, of the lever $g^8$ carries a pawl $g^5$, engaging a tooth of the ratchet $g^4$ in such manner that as the space-key is depressed the ratchet is turned one tooth, the pawl $g^6$, (shown in Figs. 5 and 9,) fulcrumed on an arm $g^{14}$ of the standard $g^2$, retaining it against retrograde tendency due to a weight (not known) on a cord $g^{15}$, attached to the periphery of a disk $g^{16}$, fixed on the shaft $g'$. A key $g^{19}$ on the shaft $g'$ projects into a wide slot $g^{20}$, Fig. 19, in the hub of the ratchet, the slot permitting the ratchet to be turned one tooth before the shaft is turned and the shaft turning thereafter with the ratchet. The shaft $g'$ and the cylinder g are thus turned an amount equal to the angular distance between the teeth of the ratchet each time the space-key is depressed after the first time. The gear-teeth $g^{10}$ of the cylinder $g^5$ mesh with corresponding rack-teeth in a plate f, which rests upon the bracket $a^2$ below the cylinder and is moved by the rotation of the cylinder toward the rear of the machine a distance dependent upon the number of space-bars inserted in the line—that is, the number of spaces to be justified in the line, or, more briefly stated, the number of spaces in the line—as I disregard in this specification any non-justifying spacer-type which for various reasons might be set in the line.

*Space-determining mechanism and its connection with the lifters.*—Carried in grooves in two stationary guide-pieces $f^6$ (inserted in the bracket $a^2$) are L-shaped pieces $f'$ $f^2$ $f^3$ $f^4$ of the form shown in Figs. 4 and 9. The machine shown being designed for a range of five sizes of spaces, (five steps on the space-bar,) there are five steps provided by the L-shaped pieces. This requires four of these pieces, each projection and the face of the lowermost piece $f^4$ constituting a step. The horizontal portion of the first of these L-shaped pieces $f'$ is carried in the topmost groove $f^8$ and has the downwardly-projecting end $f^{12}$ at right angles to the horizontal portion, and the other pieces $f^2$ $f^3$ $f^4$, are carried in the grooves $f^9$ $f^{10}$ $f^{11}$ and have the downwardly-projecting ends $f^{13}$ $f^{14}$ $f^{15}$, respectively. These pieces are movable independently in their respective grooves $f^8$ to $f^{11}$ and are provided with pins $f^{16}$ $f^{17}$ $f^{18}$ $f^{19}$, which take into grooves $f^{20}$ $f^{21}$ $f^{22}$ $f^{23}$, respectively, in the under side of the plate $f$. These latter grooves having each a different inclination to the edge of the plate $f$ communicate to the pieces $f'$ $f^2$ $f^3$ $f^4$ different movements as the plate is moved toward the rear of the machine, moving all the pieces toward the left in Fig. 6 and at the same time separating them. Their position with reference to the length of the plate $f$ as well as relative to each other is therefore determined by the number of space-bars inserted in the line, as will be more fully explained hereinafter.

Referring now more particularly to Figs. 4, 9, and 9½, each of the lower portions $e'$ of the lifters is engaged by an arm $e^6$ of a flat bell-crank lever, the rounded end $e^7$ of which takes into a V-shaped groove in the recess $e^8$ in the part $e'$. These levers are fulcrumed on a stud $e^9$, and a tension is exerted on their other ends $e^{10}$ by springs $e^{11}$, one spring being attached to each lever. These springs unimpeded would act to raise the lifters. They are, however, restrained by a bell-crank lever $e^{12}$, which is fulcrumed on the same stud $e^9$ and has a lug $e^{13}$ projecting across all the levers $e^6$. The other end, $e^{14}$, of the lever $e^{12}$ carries a roller $e^{15}$, acted upon by the cam $e^{16}$. Thus while the concentric face of the cam $e^{16}$ is passing the roller $e^{15}$ the lifters are maintained in the position shown.

Fulcrumed to each of the arms $e^6$ by knuckle-joints $e^{19}$ is a series of flat plungers $e^{20}$ to $e^{27}$, which lie side to side and are carried at their upper ends in a bearing $e^{28}$, supported on the under side of the bracket $a^2$. These plungers are each the same thickness as the downwardly-projecting ends $f^{12}$ to $f^{15}$ of the pieces $f'$ to $f^4$, heretofore described, and stand in a position such that the end plunger $e^{20}$ is in line with the end $f^{12}$ of the piece $f'$ in the normal position of the parts before the space-key has been operated. The thickness of these parts $e^{20}$ to $e^{27}$ and $f^{12}$ to $f^{15}$ bears a definite relation to the space-bar unit, in the present case being four times such unit, the purpose of which will appear later.

*Line-measuring mechanism and its connection with the space-determining mechanism.*—Projecting through an opening $h^{18}$, Figs. 4 and 13, into the path of travel $o^{13}$ in the line of matrices is an abutment-pin $h$, carried in a slide $h^2$, which may travel toward the left in a slot $h^7$, being held therein by gibs $h^8$ $h^9$. This pin stands normally at such point that if a line of matrices and space-bars of exactly the desired length, as shown in Fig. 13, is brought to rest in the path $o^{13}$ in the manner previously described the finger $k^3$ in advance of the line will stop against the pin without moving it. Any increase in the length of the line will cause the pin to be moved correspondingly to the left. Such movement of the pin $h$ is transmitted to the plate $f$, heretofore described, by mechanism as follows: The plate $f$ rests between the arms $h^{19}$ $h^{19}$, extending from a bar $h^{14}$. This bar $h^{14}$ is guided by a rib $h^{16}$ in a slot $h^{20}$, Fig. 6, and has rack-teeth cut upon the lower face of this rib and upon its forward face at $h^{15}$. The bar $h^{14}$ is held in place by a bar $h^{17}$, Fig. 5, under which it is free to slide. The fragmentary gear $h^{13}$ meshes in the teeth $h^{15}$ and is fixed upon the vertical shaft $h^{12}$, which is journaled in bearings at $h^{21}$ and $h^{11}$, Figs. 3 and 4, and carries on its upper end a fragmentary gear $h^{10}$ of one-fourth of the radius of the gear $h^{13}$. This gear $h^{10}$ meshes with teeth $h^5$, Fig. 13, on a bar $h^4$, fixed to the slide $h^2$, which carries the abutment-pin $h$, heretofore described. The plate $f$ moves rearward between the arms $h^{19}$ $h^{19}$ each time the space-key is depressed, and it is now apparent from the nature of the connection just described that this plate will be advanced toward the left an amount equal to four times the excess in the length of line over the desired length as the line is brought to rest in the path $o^{13}$ against the abutment-pin $h$, it having been pointed out that that cam $k^9$ in advancing the line stops it with the finger $k^4$ in a predetermined position distant from the pin $h$ equal to the length of the desired line plus the thickness of the finger $k^3$, wherefore with such minimum line the pin $h$ will just be engaged, but not advanced; but with a longer line the pin $h$ and slide $h^2$ will be moved along an amount equal to the excess of the length of the line, and this movement will be transmitted through the gear $h^{10}$ and the gear $h^{13}$ (the latter being four times the radius of the former) and advance the plate $f$, as described. The resulting position of the plate $f$ therefore depends on the number of space-bars in the line and on the excess of the length of the line over the desired length. This setting of the plate $f$ and the projecting ends $f^{12}$ $f^{15}$ takes place while the decreasing face $k^{10}$ of the cam $k^9$, Figs. 3 and 4, is passing the roller $k^{14}$. While the concentric face $k^{11}$ is passing the decreasing face $e^{17}$ of the cam $e^{16}$ passes the roller $e^{15}$ on the lever-arm $e^{14}$, allowing the springs $e^{11}$ to elevate the lifters until stopped by one of the plungers $e^{20}$ to $e^{27}$ engaging the end of the projections $f^{12}$ $f^{15}$ that may be standing in line with it.

The projections $f^{12}$ $f^{15}$ are of such length that if the longest one, $f^{12}$, is engaged by a plunger the space-bar engaged by the corresponding lifter is not shifted, but remains with its thickest portion $d'$ in the line. If the plunger engages the projection $f^{13}$, the corresponding space-bar will be lifted the length of one section, leaving the second or next to the thickest section $d^2$ in the line. The third, fourth, or fifth sections $d^3$ $d^4$ $d^5$ are likewise left in the line according as the third, ($f^{14}$,) fourth, ($f^{15}$,) or no projection is engaged by one of the lifters. It is generally necessary that a portion of the space-bars be lifted one section farther than the rest, as illustrated in Fig. 7, to give the proper justification. This the mechanism does in a manner now to be set forth.

*Explanation of operation of the space-determining mechanism.*—Referring to Figs. 6, 9, 10, 11, and 12, the normal position of the parts, which is their operative position for a line containing one space-bar and which is maintained until the space-key has been depressed twice, is as shown in Fig. 9, in which the projections are adjacent to each other, and the first projection $f^{12}$ is in line with the plunger $e^{20}$, which coöperates with the left-hand lifter—that is, the one engaged by the first space-bar in the line. The first depression of the space-key, simply turning the ratchet $g^4$ and not the cylinder $g$, (owing to the play shown in Fig. 9,) leaves the position of the parts unchanged. The second depression of the space-key turns the cylinder to advance the plate one step. The angle of the groove $f^{20}$ is such that the L-piece $f'$ is advanced toward the right (left in Figs. 6 and 9) a distance equal to the width of one of the plungers $e^{20}$ to $e^{27}$ by this movement, and the angle of the succeeding grooves $f^{21}$ $f^{22}$ $f^{23}$ being, respectively, two, three, and four times as great (the angles between successive grooves being equal) the pieces $f^2 f^3 f^4$ are moved to the right two, three, and four times as far, respectively, as the part $f'$, which results in separating them by an amount equal to the movement of the first piece $f'$. The parts are shown in this position in Fig. 10. The thickness of a plunger equal to four times the space-bar unit (the space-bar unit being the difference in thickness of successive portions of a space-bar) is hereinafter referred to as the "unit" of measurement or movement of these parts. Each subsequent depression of the space-key acts to move the first piece $f'$ an additional unit toward the right and to separate the parts each from the next by an additional unit. Thus after the space-key has been depressed eight times the parts will stand as shown in Fig. 11, where the first projection stands in line with the eighth plunger $e^{27}$ and the projections stand eight units apart, measuring from corresponding edges. Figs. 9, 10, and 11 therefore show the position of the parts after lines containing one, two, and eight space-bars, respectively, have been assembled and before the lines have been advanced along the channel $o^{13}$ against the abutment-pin $h$. Suppose now each of these lines is as assembled just the desired length. The finger $k^3$ will in each case come to rest against the pin $h$ without advancing it, and the projections $f^{12}$ to $f^{15}$ remain relatively to the plunger $e^{20}$ to $e^{27}$ as shown. The cam $e^{16}$ then allows the springs $e^{11}$ to elevate the lifters, as already described.

In the case of the one-space line, Fig. 9, the first plunger and lifter only are concerned. As it commences to rise it meets the projection $f^{12}$, which brings it to rest before it has risen far enough to shift the space-bar, and the length of the line is therefore not affected.

In the case of the two-space line, Fig. 10, the first two lifters are engaged by space-bars, and the first two plungers are therefore concerned. The projection $f^{12}$ standing directly above the end of the second plunger $e^{21}$, the second lifter is stopped before it rises far enough to cause the corresponding space-bar to be shifted. The first lifter is likewise prevented from rising by mechanism as follows: Referring now to Fig. 8, fixed to the right-hand side of the lower portion $e'$ of each lifter is a pin $e^{29}$ to $e^{35}$, which projects into a slot $e^{36}$ to $e^{42}$ in the next lifter to the right, the pins standing at the top of the slot in the adjacent lifters in the normal position of the parts, the pins and slots being set alternately on two levels for convenience of construction. The pin $e^{29}$ therefore prevents the first lifter from rising higher than the second one does, the pin $e^{30}$ prevents the second lifter from rising higher than the third one does, and in general these pins prevent any lifter from rising higher than any other lifter to the right of it. The slots $e^{36}$ to $e^{42}$, however, permit a lifter to rise the length of one section of the space-bar higher than the lifter to the left rises. Thus if the right-hand lifter is prevented from rising or is permitted to rise one, two, or three, &c., steps all the other lifters are prevented from rising or are permitted to rise one, two, or three, &c., steps, respectively. If, on the other hand, the first or left-hand lifter is prevented from rising, the pins $e^{29}$ and $e^{35}$ would permit the second lifter to rise one step higher than the first, the third one step higher than the second, &c. Fixed, however, to the left-hand side of the first lifter is a bracket $e^{43}$, which passes across in front of the remaining lifters and is so placed that being engaged by the lugs $e^{44}$ on each of the lifters it prevents any lifter from rising more than one step higher than the first lifter rises. From this construction it follows, therefore, in general that if any plunger is engaged by a projection $f^{12}$ to $f^{15}$, stopping the movement of the corresponding lifter, the lifters to the left of it are stopped at the same point, while the lifters to the right of it may rise one step higher. In Fig. 10, therefore, the first two lifters would be prevented from rising far enough to shift either of the two space-bars in the line, and the length of the line would not be affected. The remaining lifters would all be permitted to rise the length of one section of a space-bar; but not being engaged by space-bars the movement would produce no effect.

Fig. 11 shows the parts as they would stand for a line which contains eight space-bars and which is the required length with the largest section of all the space-bars in the line. Here the projection $f^{12}$ preventing the eight plungers from rising, none of the lifters can rise, and the length of the line is not affected. Suppose, however, that this line with eight space-bars is longer than the desired line by an amount equal to the space-bar unit. The abutment-pin $h$ will be advanced thereby an amount equal to this excess in the lines, causing the plate $f$, and with it the L-pieces $f'$ to $f^4$, to be advanced to the right in Fig. 11 four times this amount, bringing the projection $f^{12}$ above the seventh lifter. The first seven lifters will thereby be prevented from rising. The eighth lifter is free to rise the length of one section of a space-bar, shortening the line thereby the required amount. Accordingly as the line is one, two, three, &c., space-bar units longer than the required line the plate $f$ will be advanced to bring the projection $f^{12}$ above the seventh, sixth, fifth, &c., plungers, Fig. 11, allowing one more plunger in each successive case to rise to shorten the line by one more space-bar unit.

If the line is seven space-bar units too long, the projection $f^{12}$ will stand above the first plunger $e^{20}$, permitting the other seven to rise to shorten the line seven space-bar units. Eight units of excess in the line would carry the projection $f^{12}$ beyond the first plunger and bring the second projection $f^{13}$ above the eighth plunger, permitting them all to rise to shift the space-bars each one step to shorten the line by the required amount.

Fig. 12 shows the positions assumed in the case of a line which, containing eight space-bars, is thirteen space-bar units too long, and Fig. 7 shows the resultant positions of the lifters and space-bars in the line. The lift of all the plungers one step raised all the space-bars from their widest step $d'$ to the next $d^2$ and withdrew eight space-bar units from the line, and the continued lift of the five plungers to the right of the engaged plunger raised five space-bars to the step $d^3$ and withdrew five more units from the line, making the required thirteen.

In proportion as the line before justification is longer the plate $f$ is carried farther to the right to bring the successive projections above the plungers to permit them to rise by greater amounts, and consideration of the relations involved will show that in each case as many space-bar units will be removed from the line by the resulting shifting of the space-bars as the line was space-bar units too long before justification.

*Return of lifters and advancing mechanism to initial positions.*—The raising action of the lifters takes place while the concentric face $k^{11}$ of the cam $k^9$ is passing the roller $k^{14}$ and while the decreasing face $e^{17}$ of the cam $e^{16}$ is passing the roller $e^{15}$. The change in the radii of the face $e^{17}$ is sufficient to allow the maximum movement of the lifters. The increasing face $e^{18}$ engaging the roller $e^{15}$, the lifters are thereby depressed and retained at their lowest position by the concentric portion of the cam during the remainder of the rotation of the shaft. When the space-bars are lifted in the line, the spring $k^5$, acting through the finger $k^3$, keeps the line compacted, the square shoulders between the successive sections of the space-bars preventing them from again descending in the line. Following the lowering of the lifters the decreasing face $k^{12}$ of the cam $k^9$ thereafter permits the spring $k^{22}$ to advance the line farther toward the left to be transferred to the casting mechanism, the face $k^{13}$ of the cam thereafter returning these parts to their original position.

In order to allow the advancement of the line toward the left, however, it is necessary to withdraw the abutment-pin $h$ from the path $o^{13}$, which is done as an increasing face of the crown cam-ring $n$ (fastened to the side of the cam $e^{16}$) passes the end of an arm $n'$, Fig. 2, on the end of a shaft $n^2$, which carries near its other end the arm $n^3$, connected with a link $n^4$. This link is thereby depressed, rocking the bell-crank lever $n^5$, which is fulcrumed at $n^6$, Fig. 4, and engages a pin $n^7$, projecting from the abutment-pin $h$ through a slot $n^8$, Fig. 13, moving the abutment-pin to the unobstructive position shown in Fig. 4. The link $n^4$ has a bearing in the block $n^9$ and engages the bell-crank lever by means of a pin $n^{10}$, which has a sliding connection with the bell-crank lever. A decreasing face of the cam-ring passing the end of the arm $n'$ after the line has passed through the path $o^{13}$ permits the spring $n^{11}$ to raise the link $n^4$ to cause the pin $h$ to again advance into the path $o^{13}$ of the succeeding line of matrices.

*Return of space-accounting and space-determining mechanisms to initial positions.*— Carried below the frame-bracket $a^2$ is a horizontal shaft $j$, Figs. 2, 4, and 9½, having bearings in the frame $a$ and in a standard $j'$. On the rear end of this shaft is the gear $j^2$, meshing with the teeth $j^4$, cut in the side of a link $j^3$. This link straddles the shaft $l$ and has a bearing $j^5$. A roller $j^6$ on the link is engaged toward the end of the rotation of the shaft by a cam-piece $j^7$, fixed on the side of the cam $e^{16}$. This cam-piece lifts the link and rotates the shaft in a left-hand direction in Figs. 2 and 9. A key $j^8$ on the shaft $j$, engaging the gear $j^9$, which meshes with the rack $h^{16}$ on the bar $h^{14}$, causes the bar, and with it the plate $f$, to be returned to its initial position toward the right-hand end of bracket $a^2$. Keyed on the forward end of this shaft $j$ is a collar $j^{10}$, having a projecting lug $j^{11}$, Fig. 3, which engages a corresponding lug $j^{12}$ on the hub of a lever $j^{13}$, fulcrumed on the shaft. This lever passes across in front of the lifters $e$, as shown in Figs. 1 and 3, and has a rearwardly-projecting pin $j^{14}$, which as the lever is rocked toward the right in Fig. 1 by the rotation of the shaft $j$ engages such of the lifters as were in operation upon the last justified line and returns them to their original positions behind the pawl $o^8$. As the cam-piece $j^7$ passes the roller on the link $j^3$ the link descends to permit the lever $l^{13}$ to swing back out of the path of the lifters and to permit the advancement of the plate $f$ by the bar $h^{14}$, as already described.

As the vertical shaft $k^{18}$, heretofore mentioned, rotates to advance the line an inclined projecting flange $s'$, Figs. 3 and 9, on a collar $s$ engages a pin $s^3$, projecting from the end of the lever-arm $s^4$. This arm is fixed to a shaft $s^5$, passing through a bearing in the bracket $a^2$ and carrying on the other end an arm $s^6$. The upper end of this arm $s^6$ stands opposite the end of a downward-projecting arm $g^{18}$ of the retaining-pawl $g^6$, heretofore mentioned. The collar $s$ is free to slide vertically on the shaft $k^{18}$, being caused to rotate with the shaft by means of a key which projects from the collar into the slot $s^7$, Fig. 3, in the shaft. Therefore as the shaft rotates in the direction to advance the line the collar $s$ is lifted as the incline $s'$ passes the pin $s^3$, dropping back into position to meet and raise the pin as the shaft rotates in the opposite direction. This causes the arm $s^6$ to engage the arm $g^{18}$, rocking it to lift the pawl $g^6$ out of engagement with the teeth of the ratchet $g^4$, lifting at the same time, by means of the overhanging lug $g^{12}$, the pawl $g^5$. This frees the ratchet and permits the weight on the cord $g^{15}$, acting through the disk $g^{16}$ and the cylinder $g$, to return the plate $f$ to its position toward the front of the machine.

*Modification of space-determining mechanism.*—Figs. 15 to 18 illustrate a modification of portions of the space-determining mechanism. The pieces $f'$ $f^2$ $f^3$ $f^4$ are here shown as attached each to a pivot passing through an intermediate intersection of two members of a lazy-tongs construction $f^{25}$. This lazy-tongs rests in a depression $f^{26}$ in the bracket $a^2$. The pieces $f'$ to $f^4$ are affixed to its under side, the pivots $f^{27}$ $f^{28}$ ending flush with the top side of the tongs, and the pivots $f^{16}$ and $f^{17}$ extending into the grooves $f^{20}$ and $f^{21}$ in the under side of the plate $f$. This plate is moved and guided as already described. The groove $f^{20}$ acts to move the tongs toward the left in the figures as the plate is moved toward the rear of the machine. The groove $f^{21}$ being at a greater angle than the groove $f^{20}$, the two pins are thereby separated. The separation of these two pins causes the expansion throughout the length of the tongs, resulting in the separation of the pieces $f'$ to $f^4$ in the same manner as with the grooves $f^{20}$ to $f^{24}$, already described. The particular utility of this lazy-tongs construction occurs in a justifier using a materially greater range of spaces than that here shown, for under such circumstances a multiplicity of grooves in the plate $f$ might become unwieldy either from the great angles which the last grooves would make or from the increase of the transverse movement of this plate to prevent such great angles. The showing of this modification is not to be taken as intimating that other parts of the structure may not be modified, nor is the modification shown exhaustive as far as the space-determining mechanism is concerned. All the equivalents and mechanical modifications which would readily occur to one familiar with this art are still within my invention and intended to be covered by it.

I claim—

1. In a justifying mechanism, in combination, a series of movable members having projections extending different amounts at an angle to their path of movement, means for moving said members toward or from each other, a series of coöperating members adapted to engage the ends of said projections, and means for changing the relative position of said coöperating members and the series of projections as a whole, substantially as described.

2. In a justifying mechanism, in combination, a series of relatively movable members having projections extending varying amounts at right angles to their path of movement, means for proportionately varying the relative position of the members in the series relative to each other, members adapted to engage the ends of said projections, and means for varying the relative position of said members and the series as a whole, one of said variations being dependent upon the measurement of the line and the other upon the number of spaces in the line, substantially as described.

3. In a justifying mechanism, in combination, a series of members having projections extending different amounts at an angle to their path of movement, means for separating said members proportionately, a space-controlling mechanism coöperating with said projections, and including a series of plungers adapted to engage the ends of said members, means for causing varying movement in some of the parts mentioned, and means whereby said varying movement and said separation are dependent upon the number of spaces to be justified and the line's measurement, substantially as described.

4. In a justifying mechanism, in combination, a series of L-shaped members overhanging different amounts, a series of plungers coöperating with the ends of the overhanging portions of said members, mechanism for varying the relative position of said members, mechanism for varying the position of the series as a whole relatively to the plungers, one of said variations being dependent on the number of spaces in the line, and the other upon the line's variation from the required length, substantially as described.

5. In a justifying mechanism, in combination, a series of L-shaped members overhanging different amounts, means for moving said members relative to each other, a series of coöperating plungers adapted to engage the ends of said members, means for moving the members relatively to the plungers, one of said movements being dependent on the number of spaces in the line and the other on the line's variation from the required length, said plungers operating to control the size of space to be in a justified line, substantially as described.

6. In a justifying mechanism, in combination, a series of L-shaped members overhanging different amounts, a series of plungers coöperating with the overhanging ends of said projections, mechanism for separating said projections proportionately to the number of spaces in the line, mechanism for moving said projections bodily proportionately to the line's variation from the required length, substantially as described.

7. In a justifying mechanism, in combination, a series of members having upturned ends projecting varying amounts, means for separating said members proportionately to the number of spaces in a line to be justified, a series of plungers adapted to coöperate with the ends of said projections, the distance between corresponding edges of said plungers at their operative ends being equal to the amount said projections separate for each additional space, substantially as described.

8. In a justifying mechanism, a series of L-shaped members seating one within the other and guided parallel with each other, combined with mechanism adapted to engage the projecting ends of said members and determine accordingly the size of space to be in the justified line, substantially as described.

9. In a justifying mechanism, a series of L-shaped members seating one within the other and guided parallel with each other and projecting varying amounts, combined with mechanism for separating the members according to the number of spaces in the line to be justified, and mechanism adapted to engage the members and determine the size of space to be in the justified line, substantially as described.

10. In a justifying mechanism, in combination, a series of members projecting varying amounts, means for separating said members proportionately to the number of spaces in a line to be justified, a series of plungers adapted to coöperate with said projections, the distance between corresponding edges of said plungers at their operative ends being equal to the amount said projections separate for each additional space, substantially as described.

11. In a justifying mechanism, in combination, a series of members projecting varying amounts, means for separating said members equally, said separation between corresponding edges of any two members being substantially equal to the thickness of a projection multiplied by the number of spaces in a line, plungers coöperating with said projections and occupying a relative position thereto dependent on the measurement of the line, substantially as described.

12. In a justifying mechanism, in combination, a series of members projecting varying amounts, a series of plungers side by side and adapted to coöperate with said projections, said projections being substantially of the same thickness as the plungers, means for separating the said projections to cause a distance between each two of them equal to the thickness of a projection multiplied by the number of spaces in the line.

13. In a justifying mechanism, in combination, a series of plungers, means for stopping the movement of one of the plungers, means whereby all the plungers on one side are prevented from operative movement independently of that plunger but all the plungers on the other side are allowed movement in addition to the movement of said given plunger, and means whereby the movement of said plunger determines the selection of spaces to be in the justified line, substantially as described.

14. In a justifying mechanism, in combination, a series of stepped projections, a series of plungers adapted to coöperate therewith, means whereby all the plungers on one side of any plunger are prevented from operative movement independently of that plunger but all the plungers on the other side are allowed movement in addition to the movement of said given plunger equal to the projection of a step, and means whereby the movement of said plunger determines the selection of spaces to be in the justified line, substantially as described.

15. In a justifying mechanism, in combination, a series of relatively movable projections, a plurality of guides at an angle to each other coöperating with said projections, and means for moving said guides relative to the projections and thereby moving the latter toward or from each other and a space-controlling mechanism coöperating with said members, substantially as described.

16. In a justifying mechanism, in combination, a series of projecting members, guides coöperating with said projections, each guide preserving the same angle to the preceding guide, means for moving said guides relative to the projections and thereby proportionately moving them toward or from each other, and a space-controlling mechanism coöperating with said members, substantially as described.

17. In a justifying mechanism, in combination, a series of relatively movable projections, inclined grooves at an angle to each other, and connected with said projections, means for moving the grooves, while preserving their angles, relative to said projections thereby varying the latter's distance apart, substantially as described.

18. In a justifying mechanism, in combination, a series of overlapping L-shaped members, a series of inclined guides coöperating therewith, means for causing relative movement between the guides and members to change the position of the latter relative to each other, and a series of plungers coöperating with said L-shaped members, substantially as described.

19. In a justifying mechanism, in combination, a series of relatively stationary guideways, a series of members each movable in one of said guideways, projections from said members of different amounts, a series of plungers suitably guided to coöperate with said projections, means for shifting said members relative to each other along their individual guideways thereby varying their distance apart proportionately, and means for shifting the series as a whole along their guideways, substantially as described.

20. In a justifying mechanism, in combination, a series of members projecting varying amounts, means for guiding said members whereby they may be movable in the direction of a line from one member to the next, a plurality of guides at an angle to each other extending across said members and engaging with them, means for moving said guides across the members and thereby causing them to move along their guideway relative to each other to separate or approach each other, and means for shifting the guides longitudinally of said guideway to vary the position of the series as a whole, substantially as described.

21. In a justifying mechanism, in combination, a series of L-shaped members seating one within the other and guided in parallel grooves and projecting varying amounts, a block carrying guides at an angle to each other engaging with said projections, means for shifting said block parallel with the grooves in which the projections ride to shift the whole series of projections, and means for shifting the block crosswise of said grooves to vary the relative position of the projections, substantially as described.

22. In a justifying mechanism, in combination, a stepped space-bar consisting of a series of spaces graded in respect to thickness and connected together, means for determining from the measurement of a line and the number of spaces therein the size of space required in the line, and means for moving the space-bar in the line accordingly, substantially as described.

23. In a justifying mechanism, in combination, means for measuring a line of type and interspersed space-bars, which space-bars consist each of a series of spaces graded in respect to thickness and connected together in order, means for taking account of the number of spaces in the line, and means for shifting said space-bar through the line an amount dependent on the said measurement and said number, substantially as described.

24. In a justifying mechanism, a space-bar composed of a series of contiguous inseparable spaces of graded thickness connected together in order and having at the extreme end of the thickest space an ear having a notch therein, substantially as described.

25. In a justifying mechanism, a space-bar consisting of a series of spaces graded in thickness connected together, combined with means for moving said space-bar through a line of type an amount previously determined by measurement of the line and the number of spaces in the line, means for measuring the line, means for taking account of the number of spaces in the line, thereby determining the movement of the space-bar, substantially as described.

26. In a justifying mechanism, in combination, means for measuring a line of type and interspersed space-bars which space-bars consist each of a series of spaces graded in respect to thickness, the measurement taking place while corresponding portions of each bar are in the line, means for taking account of the number of spaces to be justified, and means for moving the bars through the line to vary the spacing thereof as required by said measurement and by the number of spaces for justification, substantially as described.

27. In a justifying mechanism, in combination, a series of stepped space-bars, each consisting of a series of spaces graded in respect to thickness and rigidly connected together, means for measuring the amount which a line containing such space-bars with their thickest operative portion in action is greater than the desired length of the line, means for taking account of the number of spaces in the line, and means governed by these two factors for withdrawing space-bars from the line to reduce its length, substantially as described.

28. In a justifying mechanism, in combination, means for measuring a line of type and interspersed space-bars which space-bars consist each of a series of spaces graded in respect to thickness, the measurement taking place while the thickest portion of the bar is in the line, and means for thereafter withdrawing the bar, to have a thinner portion in the line, an amount dependent on the measurement of the line and the number of spaces therein, substantially as described.

29. In a justifying mechanism, in combination, a series of space-bars each consisting of spaces graded in respect to thickness and connected together, means for inserting such bars into a line being assembled with their thick ends uppermost, means for measuring the line while such thick ends are in the line, a series of lifters, means for causing them to engage with the space-bars in the line, a space-determining mechanism varied by the said measurement of the line and the number of space-bars in it, a suitable connecting mechanism between said space-determining mechanism and the lifters whereby the lifters raise the space-bars to have thinner portions of them in the line as required to properly justify it, substantially as described.

30. In a justifying mechanism, in combination, a series of stepped space-bars, each bar consisting of a series of spaces graded with respect to thickness and rigidly connected together, means for inserting said bars in a line being set with their thick portions between the matrices of the line said space-bars thus depending from the line, means for taking account of the number of spaces in the line, means for measuring the line when the thick portions of the space-bars are in the line, a series of lifters adapted to engage the space-bars, a means for causing them to lift the bars out of the line an amount dependent upon such measurement and such account of the number of spaces, and means for thereafter compressing the line whereby the shoulder between the engaged step and the one above it holds the space-bar from descending, substantially as described.

31. In a justifying mechanism, in combination, a series of space-bars, means for advancing them with a line to be justified, a series of independently-movable lifters normally out of engagement with the space-bars, and means whereby each space-bar in the line engages a lifter as the line moves along, substantially as described.

32. In a justifying mechanism, in combination, a series of space-bars each having a projecting ear, means for advancing a line with such bars interspersed, a series of independently-movable lifters, each lifter being adapted to engage an ear of a space-bar presented to it, and means for moving the lifter to withdraw the space-bars, substantially as described.

33. In a justifying mechanism, in combination, a series of stepped space-bars, means for advancing them with a line to be justified, a series of independently-movable lifters means for causing each space-bar to be engaged by a lifter, and means for moving said lifters an amount dependent on the variation of the line from the required length and the number of spaces to be justified therein, substantially as described.

34. In a justifying mechanism, in combination, a series of space-bars, means for advancing them with a line to be justified, a series of lifters longitudinally guided, said lifters each having a swinging part adapted to engage said space-bars whereby the space-bars and lifters may move together with the line, and means for moving said lifters longitudinally to move the space-bars through the line, substantially as described.

35. In a justifying mechanism, in combination, means for holding a line with interspersed space-bars, a series of lifters adapted to engage the space-bars and by their movement shift them in the line, means whereby all the lifters on one side of and lifter are prevented from operative movement independently of that lifter, but all the lifters on the other side are allowed movement in addition to that of the given lifter, substantially as described.

36. In a justifying mechanism, a series of longitudinally-movable bars arranged side by side, projections on one side of said bars engaging elongated recesses in the adjacent bar, and an extension carried by one of said bars and adapted to engage all the others thus limiting the movement of said other bars, combined with a series of projections and a series of spaces to be in the justified line, and connecting mechanism between said bars and said projections and spaces, substantially as described.

37. In a justifying mechanism, in combination, a series of longitudinally-movable bars side by side, pins as $e^{29}$ $e^{30}$, &c., projecting in the same direction from one side of said bars, recesses $e^{36}$ $e^{37}$, &c., in said bars with which the pins of the adjacent bars engage, a bracket as $e^{43}$ carried by an extreme bar and extending across the other bars, lugs as $e^{44}$ on these other bars adapted to engage said bracket whereby the bar carrying the bracket is prevented from moving independently of the other bars, but the other bars are allowed a movement independent of said first bar which is equal to the space between said lugs and bracket, and a series of projections connected with said bars, and means for changing the relative position of said projections, substantially as described.

38. In a justifying mechanism, in combination, means for holding a line of type with interspersed space-bars, a series of lifters adapted to engage the space-bars and by their movement change the position thereof in the line, a series of projections, a series of plungers coöperating with the projections, means for changing the relation of the plungers to the projections according to the number of spaces in the line and the line's variation from the required length, and a connection between the plungers and lifters, substantially as described.

39. In a justifying mechanism, in combination, means for holding a line with interspersed space-bars, a series of lifters adapted to engage said bars, springs giving said lifters a tendency to move the bars through the line, means for restraining the action of said springs and for releasing them and allowing them to operate the lifters, and means governed by the measurement of the line and the number of spaces therein for determining the amount of movement of the lifters, substantially as described.

40. In a justifying mechanism, means for guiding the line with interspersed space-bars, a series of lifters adapted to engage said space-bars, a series of levers adapted to elevate said lifters, a series of springs operating individually on the levers giving them a tendency to so operate the lifters, and means for restraining all of said levers and for allowing them to go into action collectively, individual plungers connected with the levers, and a series of projections coöperating therewith and determining by their relative position which levers and lifters shall go into operation, substantially as described.

41. In a justifying mechanism, in combination, a series of relatively movable projections, a plate carrying a series of guides engaging said projections and adapted by the movement of the plate to change their relative position, a rack on said plate, a gear engaging said rack, and a connection between said gear and the space-key whereby the actuation of the latter shifts said plate, means for measuring a line and shifting said plate with the whole series of projections bodily according to said measurement, and a connection between said projections and spaces to be in a justified line, substantially as described.

42. In a justifying mechanism, in combination, means for holding in a line of type and interspersed stepped space-bars, a movable abutment, means for moving the same a distance proportionate to the excess in length of said line over the desired length, a space-accounting mechanism for taking account of the number of spaces in the line, a series of projections movable relatively to each other and movable bodily, a connection between said projections and said movable abutment and said space-accounting mechanism, whereby the projections come into a composite position dependent upon the measurement of the line and to the number of spaces and a connection between said projections and the spaces to be in a justified line, substantially as described.

43. In a justifying mechanism, means for holding a line with interspersed space-bars each consisting of a series of spaces graded in respect to thickness and connected together, a movable abutment, means for advancing the line to shift the abutment a distance proportionate to the excess of the line over the desired length, a series of projections, a connection between such series and such abutment whereby the movement of the latter shifts the whole series proportionately, means for taking account of the number of spaces in the line and a connection between such means and the projections whereby they are moved relative to each other according to such number, means for moving said space-bars through the line to decrease the length thereof, and a connection between the space-bars and the projections whereby the latter determine the amount of such movement, substantially as described.

44. In a justifying mechanism, in combination, means for holding a line with interspersed space-bars, means for advancing the same, a movable abutment standing in the path of such advancement, a space-determining mechanism, a connection between it and the abutment whereby the excess of the line varies the space-determining mechanism, means for varying the space-determining mechanism according to the number of spaces in the line, a connection between the space-bars in the line and the space-determining mechanism whereby the space-bars are withdrawn from the line an amount dependent upon the space-determining mechanism, means for withdrawing said abutment and advancing the line after such withdrawal of the space-bars, substantially as described.

45. In a justifying mechanism, in combination, means for holding a line with interspersed space-bars, means for advancing it along a path, an abutment extending in said path and moved by said advancement according to the excess in length of the line over the desired length, a plate movable in one direction according to the movement of said abutment, means for moving the plate in another direction according to the number of spaces in the line, a series of projections independently guided in a path parallel with one of the movements of said plate, said projections having a sliding engagement with said plate at varying angles whereby one of the movements of the plate changes the relative positions of the projections and the other movement changes their bodily position, and a connection between said projections and the space-bars in the line, substantially as described.

46. In a justifying mechanism, in combination, a series of projections guided parallel with each other, a plate adapted to move parallel with said guideway and across the guideway, a sliding connection between said projections and plate by means of guides at an angle to each other whereby one movement of the plate varies the relative position of said projections and the other the bodily position, means for measuring the line and for taking account of the number of spaces therein, and means for communicating these two measurements respectively to the plate giving it the two movements mentioned, substantially as described.

47. In a justifying mechanism, in combination, a series of projections guided parallel with each other, a plate adapted to move parallel with said guideway and across the guideway, a sliding connection between said projections and plate by means of guides at an angle to each other whereby one movement of the plate varies the relative position of said projections and the other the bodily position, a rack carried by said plate, a gear engaging said rack, and connections between the gear and a space-key, means for holding a line with interspersed spaces, an abutment extending into the path of said line, a connection between said abutment and plate whereby the movement of the abutment shifts the plate, means for advancing the line against the abutment, and a connection between the spaces in the line and the projections, substantially as described.

48. In a justifying mechanism, in combination, means for holding a line of matrices and interspersed stepped space-bars, means for advancing the same along a pathway, an abutment extending into the pathway, means for stopping the line with its rear end at a predetermined point whereby the advancement of the abutment is dependent upon the excess of the line over the desired length, a plate shiftable in two directions, a connection between said plate and abutment whereby the plate is moved in one direction according to the movement of the abutment, a space-key, and a connection between the same and a supply of space-bars and the said plate, whereby the same actuation of the key which inserts a space-bar shifts said plate, a series of projections varied in position by the movement of said plate, and a connection from said projections to the space-bars whereby the same may be moved through the line an amount dependent upon the excess in length of the line and the number of spaces therein, substantially as described.

49. In a justifying mechanism, in combination, means for holding a line of matrices and interspersed stepped space-bars, means for advancing the same along a pathway, an abutment extending into the pathway, means for stopping the line with its rear end at a predetermined point whereby the advancement of the abutment is dependent upon the excess of the line over the desired length, a plate shiftable in two directions, a connection between said plate and abutment whereby the plate is moved in one direction according to the movement of the abutment, a space-key and a connection between the same and a supply of space-bars and the said plate, whereby the same actuation of the key which inserts a space-bar shifts said plate, a series of projections movable relatively to each other, and movable bodily, a connection between said projections and said plate whereby one of the movements of the plate causes a movement of the projections relative to each other and the other movement of the plate causes a bodily movement of the projections, a series of plungers adapted to engage said projections, and a connection between said plungers and the space-bars in the line whereby the latter may be shifted an amount dependent upon the excess in the line length and the number of spaces in the line, substantially as described.

In testimony whereof I hereunto affix my signature in the presence of two witnesses.

FRANCIS B. CONVERSE, Jr.

Witnesses:
CHARLES PLATNER,
GEO. REILLY.